May 23, 1933.  G. BLASER  1,910,670

TREATMENT OF WEBS AND SHEETS WITH FLUIDS

Filed March 13, 1929  3 Sheets-Sheet 1

Inventor
Gebhard Blaser
By his Attorneys
Hauff Marland

Inventor
Gebhard Blaser
By his Attorneys

May 23, 1933.    G. BLASER    1,910,670
TREATMENT OF WEBS AND SHEETS WITH FLUIDS
Filed March 13, 1929    3 Sheets-Sheet 3

Inventor
Gebhard Blaser
By his Attorneys
Hauff Harland

Patented May 23, 1933

1,910,670

UNITED STATES PATENT OFFICE

GEBHARD BLASER, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

TREATMENT OF WEBS AND SHEETS WITH FLUIDS

Application filed March 13, 1929, Serial No. 346,716, and in Germany March 19, 1927.

The present invention relates to a process and apparatus for treating webs or sheets of paper, textile fabrics, metal foils and like material with a liquid or gaseous medium.

The staining of paper is usually performed in the beater and therefore prior to the formation of the web, or else subsequently by dipping or brushing. Only papers of one colour however, can be produced in this manner, the application of patterns, such as stripes, wavy lines, and the like, or staining on one side only, necessitating a further working operation. In order to obviate such further operation, it has already been proposed to produce patterns and unilateral stainings in the paper-making machine itself. According to the processes of this kind already known the colouring agents are applied to the paper web by special printing or painting devices, such as rollers, felt and the like. According to this method of working, however, even with careful manipulation, it is impossible in many instances to prevent the occurrence of changes in the structure of the paper, and further it is admittedly difficult to obtain an exact reproduction of an effect which has been produced, so that a good deal of waste is sometimes caused.

I have now found that various effects can be readily obtained on webs of paper either in the paper-making machine itself at any convenient stage of dewatering, i. e. on the sieve, pressing or drying section of the machine, or outside the said machine, by a simple process unattended by the aforesaid drawbacks. Moreover the process is also applicable to sheets of material other than paper, for example, textile fabrics, metal foils and other materials. For the sake of clearness the invention will hereinafter be described with respect to paper only, but the invention is not restricted thereto.

According to this invention a web of paper is drawn across orifices disposed in the upper surface or cover of a box or boxes filled with a liquid or gaseous medium with which the web is to be treated, whereby a sucking effect is produced drawing the liquid or gaseous medium out through the said orifices. In this manner the web can be stained or treated with any desired fluid, i. e. liquid or gaseous medium, for example, with solutions, emulsions or suspensions of dyestuffs, waxes, resins, oils and the like or with gases, such as for instance chlorine, or substances may be applied which produce colour effects with other substnces incorporated with the paper pulp and the like. The orifices may have any desired shape, for instance they may be in the form of a slit or several slits one after the other, arranged at a right angle to the moving direction of the web, or at any other desired angle, or circular openings arranged in one or more rows and arranged at equal or different distances. The width of the slits or other openings to be used largely depends on the structure of the web to be treated and may be the larger, the greater the strength of the web. In case a paper web is to be treated the width of the orifices employable also depends on the degree the paper web is dewatered and must be the smaller, the higher the water content. A width of each single orifice of about 3 millimetres will be suitable nearly in all instances. In case a sheet or web of a material of a high strength, such as for example textile fabrics, are to be treated, the orifices may be much wider for instance 1 or 2 centimetres. The width of the orifices employed also depends on the speed at which the sheet is passed over the said orifices and may be the larger the higher the speed. Intentional effects may be produced, in a simple manner, by altering the position of the delivery orifices, temporarily interrupting the flow or modifying the feed of the media for staining or treating the paper. Any desired number of the said boxes may be disposed in succession or side by side, each of which may supply a convenient medium. The boxes may be rigidly interconnected or movable, as, for example, by conecting with an eccentric of variable stroke. The supply pipe may be partly or entirely closed, in an automatic manner, by setting a cock, or by squeezing pieces of rubber tubing, in the supply pipes, by means of a lever actuated by cams which are disposed on a revolving cylindrical surface in a manner corresponding to the effect desired.

When carrying out the process on the sieve section of a paper-making machine, a typical arrangement of a device according to this invention comprises below the sieve or endless wire cloth on which the paper web is situated for dewatering, a box provided at its area of contact with the sieve, with orifices of any desired shape, through which the medium provided for staining or treating the web is supplied to the paper by the suction set up by the travel of the sieve and paper web over the said orifices.

Particular effects may be produced on the web in a simple manner according to the aforesaid process, by imparting to the web which is to be treated a locally varying capacity for absorbing the agent for colouring or for other treatment of the web. Such local variation in its capacity for absorption may be produced by various methods, for example, by applying pressure to the web at different places, or by treating the web at different places with means for causing, removing, lessening or increasing the capacity for absorption, such as wetting agents, for example, napthalene sulphonic acids, Turkish red oil, alcohols and the like or water repelling agents, such as waxes, resins in the form of emulsions or solutions, or parafin oils and the like, or by applying, for example, to a web which cannot be dyed with a certain dyestuff a substance capable of being dyed with the said dyestuff, for instance a solution of gelatine, and afterwards treating the web with the said dyestuff in the before-described manner.

The invention will be further described with reference to the several arrangements shown diagrammatically in the accompanying drawings, but the invention is not restricted thereto.

In the drawings:

Figures 6' to 11' are sections through the upper covers shown in Figures 6 to 11 along line X—X thereof.

Figure 1:
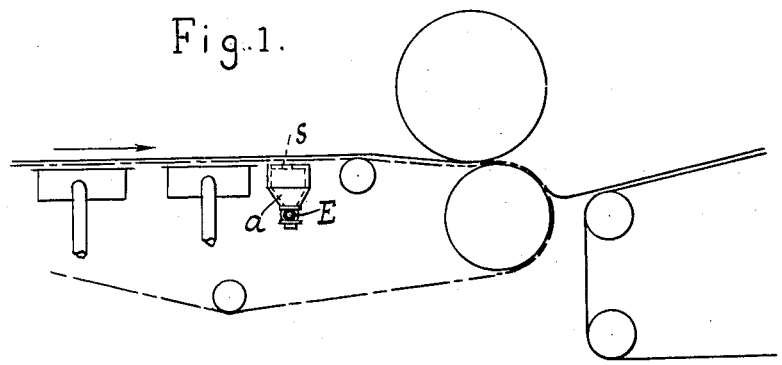
Figure 1 is a side elevation of the sieve section and Figure 2 is a side elevation of the drying section of a paper making machine showing the arrangement of the device for supplying fluids to the paper web.
Figure 2:
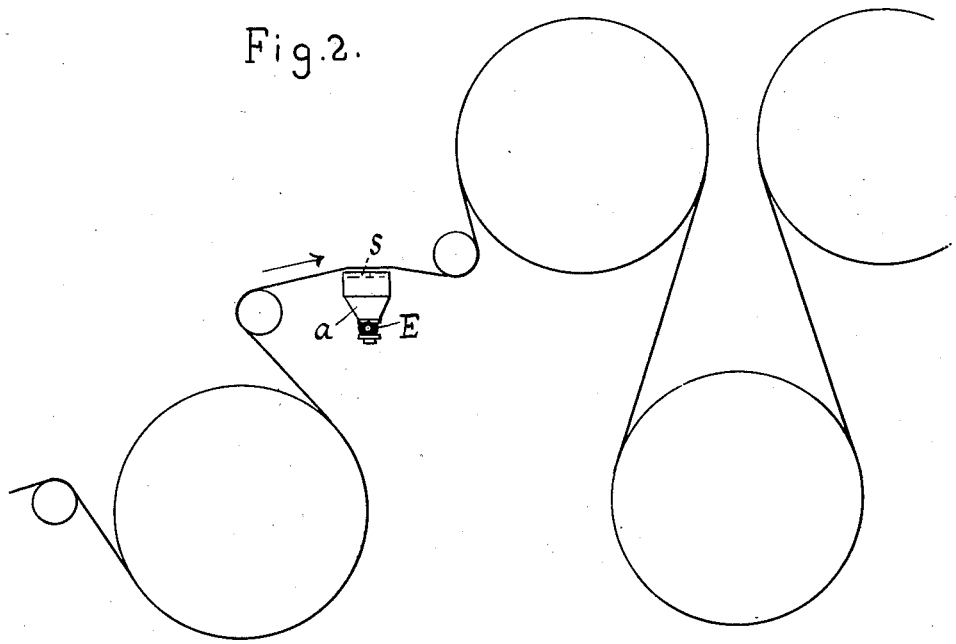
Figure 3:
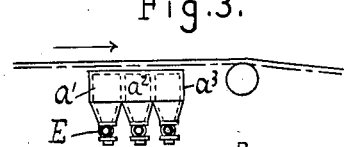
Figure 3 is a side elevation of a device for supplying different fluids to the web and Figure 4 is a plan view of the same device.
Figure 4:
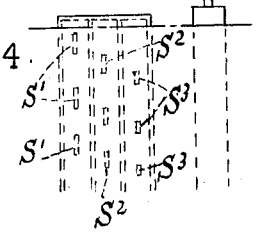

According to the arrangement shown in Figure 1, the paper stuff is stained on the sieve. The staining solution is contained in the box $a$, the top of which is provided with orifices, such as slits or holes $s$ and the box is supplied with the staining solution, through a supply pipe E. Figure 2 shows a similar staining device which is situated in the drying division of the machine, the reference letters indicating similar parts as in Figure 1. Figures 3 and 4 represent a portion of a device similar to that shown in Figure 1. In this case, however, several boxes $a_1$, $a_2$, $a_3$, the orifices $S_1$, $S_2$, $S_3$, of which may, for example, be staggered, are provided in order to produce polychrome effects.

Figure 5:
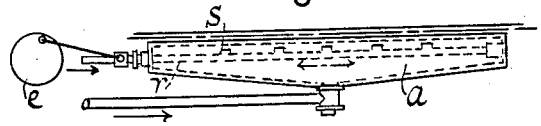
Figure 5 is a side elevation of a device for supplying fluids to a web provided with two pipes for feeding different fluids, one of said pipes being movably arranged.

Figure 5 shows a device adapted, for example, for the production of cloud effects. In this arrangement, in the box $a$, which is placed at any convenient part of the dewatering sieve and is charged with a staining solution, or water, an interior pipe $r$ can be reciprocated by an eccentric $e$, or equivalent means, and is supplied with another staining solution, or with water in case a staining solution is supplied to the aforesaid box, which is discharged through nozzle $s$.

Figure 6:
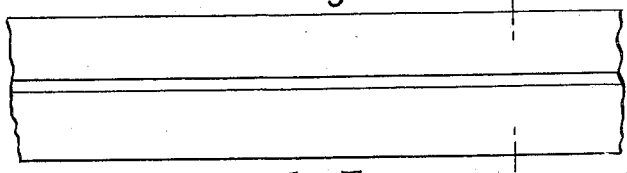
Figures 6 to 11 and 12 to 17 illustrate in plan view upper covers of the devices for supplying fluids to the web, showing differently shaped orifices.
Figure 6:
Figure 7:
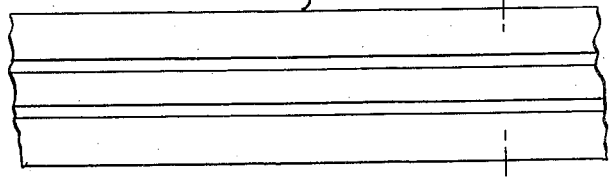
Figure 7:
Figure 8:
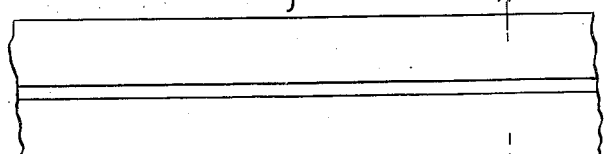
Figure 8:
Figure 9:
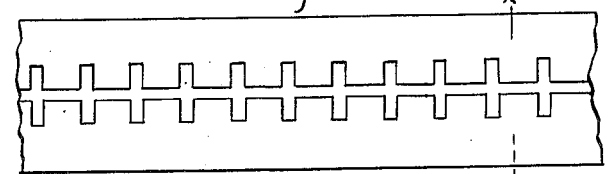
Figure 9:
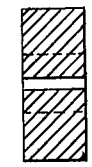
Figure 10:
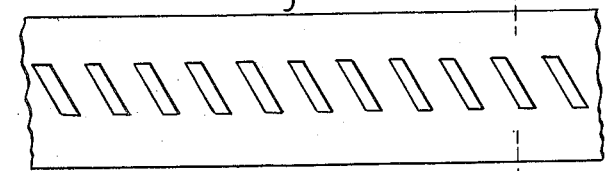
Figure 10:
Figure 11:
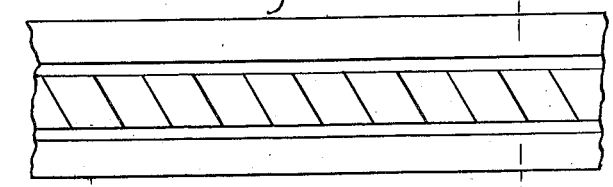
Figure 11:
Figure 12:
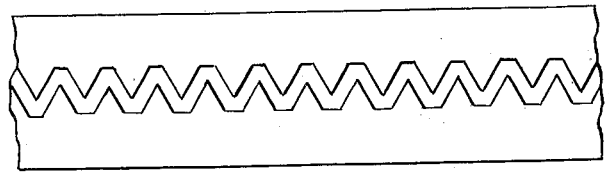
Figure 13:
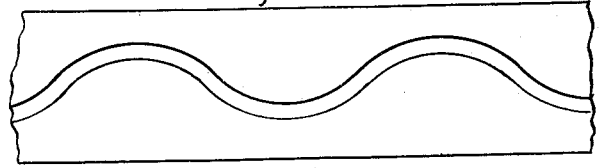
Figure 14:
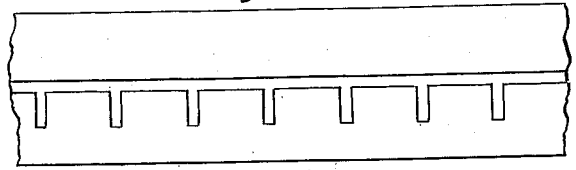
Figure 15:
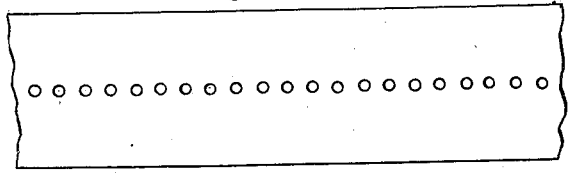
Figure 16:
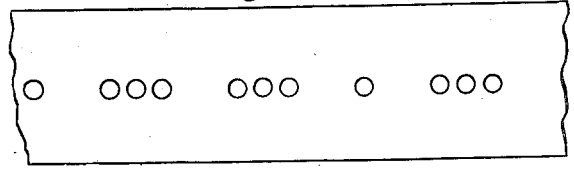
Figure 17:
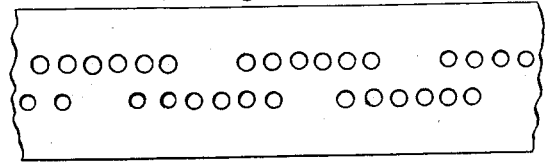

Figure 6 to 17 illustrate several shaped orifices of the kind already described across which the web of paper or the like is drawn, Figs. 6' to 11' being cross-sections on line X—X of Figs. 6 to 11.

The following examples will further illustrate how the invention may be carried out in practice, but the invention is not restricted to these examples.

*Example 1*

A sheet of paper on being unwound from a reel is passed over a box containing a solution of Cotton black E extra (Colour Index No. 681). The paper is stained on one side only.

*Example 2*

Tin foil is provided with a liquid adhesive by passing it over a box containing a solution of glue.

*Example 3*

A woolen fabric pretreated with soap is made water-proof by passing it over a box containing a solution of aluminium acetate.

*Example 4*

The moisture content of a paper web is lowered by locally applying pressure on the web, and the web is then drawn over a device as shown in Figure 1 or 2 containing in the box a 5 per cent solution of Malachite green. The paper is less intensively coloured at the places where pressure has been applied.

*Example 5*

A tin foil which cannot be coloured by Paper Fast blue 4G extra, coming from a roller, is treated in places with an aqueous solution of 5 per cent of gelatine which can be dyed by the said dyestuff; the foil is then drawn over a device containing in the box a 1 per cent solution of the said dyestuff.

*Example 6*

A paper web which is still moist, is treated in places with a 2 per cent aqueous solution of sodium isopropyl naphthalene sulphonate which increases the absorptive capacity of the paper web; the said web is then drawn over a device as shown in Figure 2 containing in the box a 3 per cent solution of Congo red R extra (Colour Index No. 370). The treated places are coloured deeper shades.

*Example 7*

A paper pulp is mixed in the mill with 10 per cent by weight of the dry pulp of potassium ferrocyanide and the moist web of paper placed on the sieve is drawn over a box filled with a 10 per cent aqueous solution of iron chloride.

*Example 8*

A moist web of paper coloured in the mill with 0.5 per cent by weight of the dry pulp of Methyl violet, placed on the sieve is drawn over a box containing an aqueous 3 per cent solution of tannin.

*Example 9*

A web of paper is made proof against ignition by passing it in an apparatus as shown in Figure 2 over a box containing a 20 per cent aqueous solution of ammonium sulphate.

*Example 10*

Safety paper is obtained by passing a web of coloured or uncoloured unsized paper through an apparatus as shown in Figure 2 over a box supplying in stripes an emulsion of solid paraffin.

What I claim is:

1. A process of treating paper webs with liquids, which comprises passing a still moist paper web between the pulp stage and the dry paper stage freely over and in contact with a narrow bed of the liquid with which it is to be treated so that the movement of the paper web causes a positive suction which draws said solution into said paper web.

2. A process of treating paper webs with liquids, which comprises passing a still moist paper web between the pulp stage and the dry paper stage freely over and in contact with several narrow beds of different liquids with which it is to be treated so that the movement of the paper web causes a positive suction which draws said solution into said paper web.

3. A process of treating paper webs with liquids, which comprises imparting to a still moist paper web between the pulp stage and the dry paper stage a locally varying absorption capacity and then passing it freely over and in contact with a narrow bed of the liquid with which it is to be treated so that the movement of the paper web causes a positive suction which draws said solution into said paper web.

4. A process of staining paper webs, which comprises passing a still moist paper web between the pulp stage and the dry paper stage freely over and in contact with a narrow bed of a staining solution so that the movement of the paper web causes a positive suction which draws said solution into said paper web.

5. The process of decorating paper while on a paper machine which comprises freely moving the same over a receptacle containing a treating solution, said receptacle having restricted passages in its upper end so that the movement of the paper causes a positive suction which draws said solution through said passages into said paper, said solution being located at a point in the paper machine intermediate the wet and dry ends thereof.

6. A process as defined in claim 5 wherein said passages are smaller the closer said receptacle containing the solution is to the dry end of the paper machine.

In testimony whereof I have hereunto set my hand.

GEBHARD BLASER.